United States Patent [19]

Crowell

[11] Patent Number: 4,815,681
[45] Date of Patent: Mar. 28, 1989

[54] STUNT KITE DIHEDRAL WING

[76] Inventor: Robert L. Crowell, Rt. 2, Box 87, Blowing Rock, N.C. 28605

[21] Appl. No.: 129,552

[22] Filed: Dec. 7, 1987

Related U.S. Application Data

[63] Continuation-in-part of Ser. No. 934,828, Nov. 25, 1986, Pat. No. 4,742,977, which is a continuation of Ser. No. 925,923, Nov. 3, 1986, abandoned.

[51] Int. Cl.⁴ .............................................. B64C 31/06
[52] U.S. Cl. ............................................... 244/153 R
[58] Field of Search ................... 244/13, 16, 900–904, 244/153 R, 123, 154

[56] References Cited

U.S. PATENT DOCUMENTS

| | | |
|---|---|---|
| 2,784,524 | 3/1957 | Jackle . |
| 2,793,870 | 5/1957 | Bowman . |
| 2,896,370 | 7/1959 | Witt, Jr. . |
| 2,932,124 | 4/1960 | Robinette . |
| 3,246,425 | 4/1966 | Miller . |
| 3,305,198 | 2/1967 | Sellers, Jr. . |
| 3,768,823 | 10/1973 | Goldberg . |
| 3,790,112 | 2/1974 | Holland, Jr. . |
| 3,801,052 | 4/1974 | Quercetti . |
| 3,898,763 | 8/1975 | Rizzo . |
| 3,924,870 | 12/1975 | Spivack et al. . |
| 3,943,657 | 3/1976 | Leckie . |
| 3,949,519 | 4/1976 | Meyer . |
| 3,951,363 | 4/1976 | Grauel . |
| 3,954,235 | 5/1976 | Powell . |
| 3,963,200 | 6/1976 | Arnstein . |
| 3,995,799 | 12/1976 | Bartolini .................... 244/16 |
| 4,076,189 | 2/1978 | Powell . |
| 4,099,690 | 7/1978 | Mendelsohn . |
| 4,136,631 | 1/1979 | Nimchuk . |
| 4,186,680 | 2/1980 | Harpole . |
| 4,272,044 | 6/1981 | Cooper . |
| 4,277,040 | 7/1981 | Christoffel, Jr. . |
| 4,286,762 | 9/1981 | Prouty . |
| 4,336,915 | 6/1982 | Stoecklin et al. . |
| 4,458,442 | 7/1984 | McDaniel . |
| 4,473,022 | 9/1984 | Eastland . |
| 4,557,443 | 12/1985 | Christoffel, Jr. . |
| 4,736,914 | 4/1988 | Tabor . |

FOREIGN PATENT DOCUMENTS 2951344 12/1979 Fed. Rep. of Germany .

Primary Examiner—Galen Barefoot
Attorney, Agent, or Firm—James W. Hellwege

[57] ABSTRACT

An improved stunt kite wing structure is provided comprising an aerodynamic dihedral sail structure having a fabric sail tensioned on a supporting frame comprised of lateral brace members and a longitudinal member intermediate the ends of the lateral braces together with connecting opposing lateral spar members. The tensioning of the sail and the configuration of the supporting frame is such that the sail assumes a dihedral shape, with the sail being caused to assume a tensioned or stressed condition along a portion of the leading edge of the sail intermediate the respective lateral ends of the sail such that the sail is spaced from the longitudinal brace member.

15 Claims, 4 Drawing Sheets

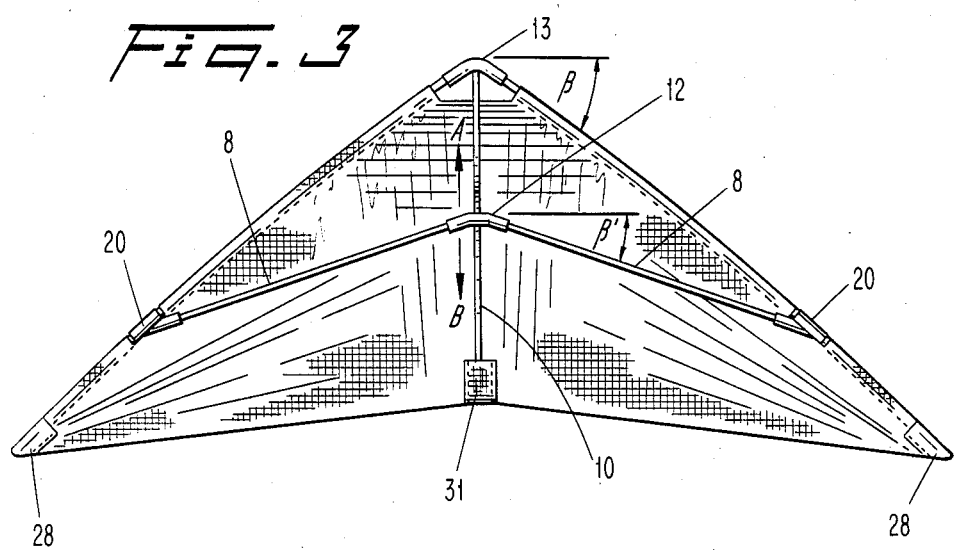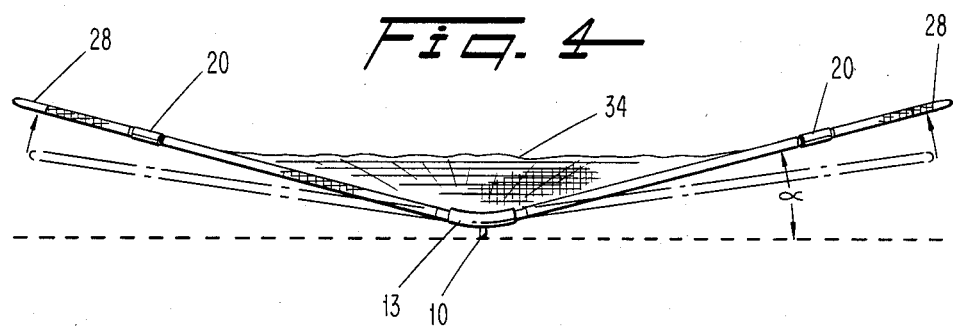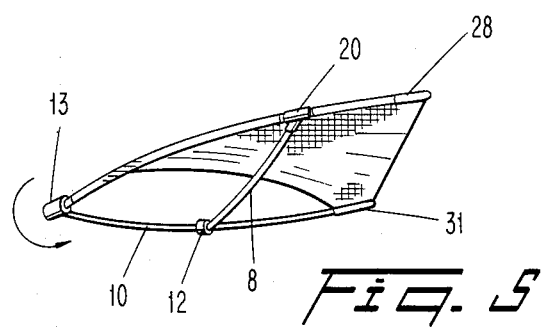

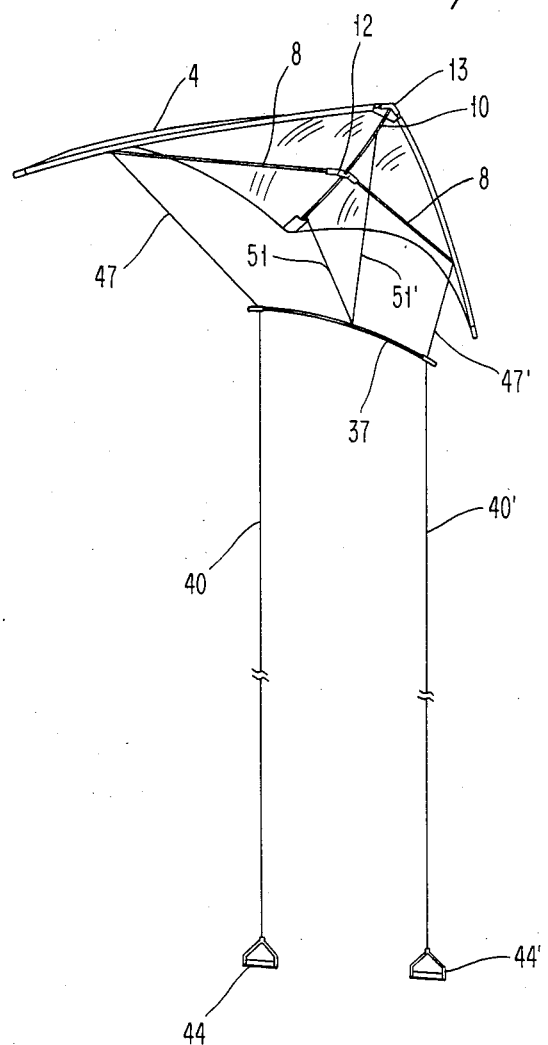

4,815,681

STUNT KITE DIHEDRAL WING

CROSS-REFERENCE TO RELATED APPLICATION

This application is a continuation-in-part of application Ser. No. 934,828, filed Nov. 25, 1986, now U.S. Pat. No. 4,742,977, issued May 10, 1988, which is a continuation-in-part of application Ser. No. 925,923, filed Nov. 3, 1986, now abandoned.

BACKGROUND OF THE INVENTION

The present invention relates to an improved stunt kite dihedral wing.

Dihedral wings have been employed for a long period of time and have both taken many forms and been adapted to various uses. For example, U.S. Pat. No. 3,954,235 discloses a dihedral kite wing and U.S. Pat. No. 3,898,763 discloses a dihedral model aircraft wing. Related wing structures (although not dihedral in configuration) are disclosed in U.S. Pat. Nos. 2,793,870; 3,768,823; 3,924,870; 4,136,631; 4,186,680 and 4,473,022 which disclose various forms of hand-held sail structures designed for the propulsion of a person. Additionally, U.S. Pat. Nos. 2,784,524; 2,896,370; 2,932,124; 3,246,425; 3,943,657; 3,949,519; and 4,458,442 are each directed to various types of toy glider wings.

One disadvantage with respect to known prior art wings is the desire to enhance the lift characteristics of the wing without disadvantageously increasing the mass or weight of the wing. It has also not heretofore been possible to provide such increased lift by means of a camber portion at the leading edge of the wing without the necessity for prestressed structural members within the wing itself. For example, German Pat. No. 29 51 344 discloses the use of rigid, profiled, flexible spars at the ends of an ultralight glider wing to provide a curved contour along the full extent of the wing.

A further disadvantage regarding stunt kite wings relates to their maneuverability and attainable speed. Conventional stunt kite wings, while generally satisfactory in such respects, could with advantage possess enhanced flight characteristics to appeal to the skill level of advanced stunt kiters.

For example, various known stunt kites employ multiple lateral spar members to enhance the structural stability of the supporting structure of the kite in view of the large span of the kite wing. Such lateral spars are relatively inflexible in design and directly connect one lateral brace member of the wing to an opposing lateral brace member without intermediate attachment to the longitudinal brace member. Such spars are thus generally unbowed by nature. The noted spar members are oriented at an angle perpendicular to the axis of the longitudinal brace member.

In an alternate configuration, a known stunt kite employs two connecting spars which connect the opposing lateral brace members and which are also attached to the longitudinal brace member. In this particular kite the lateral spars are bowed to conform to the configuration of the sail and the spars are also oriented at an angle perpendicular to the axis of the longitudinal brace member.

Such known stunt kites suffer from the disadvantage that movement of the lateral brace members during flight is inhibited by the presence of the lateral brace members. Such kites are thus not readily adapted to varied flight conditions.

OBJECTS AND SUMMARY OF THE INVENTION

It is accordingly an object of the present invention to provide an improved wing for use in stunt kites.

It is also an object of the present invention to provide an improved wing which avoids the need for the use of prestressed members to induce the formation of a camber in a fabric sail.

It is further an object of the present invention to provide an improved wing which exhibits enhanced lift as a result of the presence of an induced camber.

It is also an object of the present invention to provide a wing of enhanced durability as a result of minimizing the presence of structural members within the wing.

It is also an object of the present invention to provide an improved strunt kite wing which exhibits satisfactory flight characteristics at high speeds.

It is still further an object of the present invention to provide an improved stunt kite wing which is capable of adapting to varied flight conditions.

In accordance with the present invention there is thus provided an improved stunt kite wing comprising an aerodynamic dihedral sail structure having a fabric sail tensioned on a supporting frame, said supporting frame comprised of opposing elongated lateral brace members along the leading edge of the wing and an elongated longitudinal brace member positioned along the lower surface of said wing intermediate the ends of the lateral brace members, first ends of said lateral brace members and a first end of said longitudinal brace member being attached to one another at a common terminus centrally positioned along the leading edge of the wing to define a fixed dihedral and sweep angle, the leading edge of said fabric sail being attached to both said lateral brace members and to a rearwardly disposed second end of said longitudinal brace member, with said sail extending between laterally disposed second ends of said lateral brace members and said rearwardly disposed second end of said longitudinal brace member, opposing lateral spar members each being attached to said lateral brace members at points intermediate said first and second ends of each said lateral brace members as well as to said longitudinal brace member at a common point, said common point of attachment being forwardly disposed of the point of attachment of said spar members to said lateral brace members, said lateral and longitudinal brace members being so attached to one another and said sail being so configured and caused to be tensioned over said brace members whereby a dihedral sail is formed, the lateral ends of which are positioned rearwardly from said common terminus centrally positioned along the leading edge of said sail and which sail is spaced from the portion of the longitudinal brace member extending between said common terminus and said spar members.

BRIEF DESCRIPTION OF THE DRAWINGS

FIG. 3 is a bottom view of the embodiment of the improved wing of the present invention depicted in FIG. 1.

FIG. 4 is a front view of the embodiment of the improved wing of the present invention depicted in FIG. 1.

FIG. 5 is a side view of the embodiment of the improved wing of the present invention depicted in FIG. 1.

FIG. 8 is a view in perspective of a kite comprising the embodiment of the improved wing of the present invention depicted in FIG. 1 configured for flight.

DETAILED DESCRIPTION OF THE PRESENT INVENTION

Figure 1:
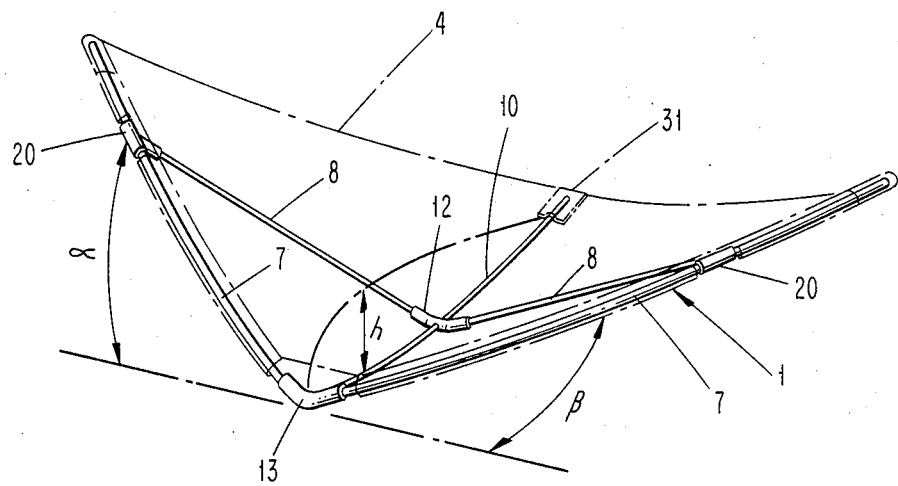
FIG. 1 is a front perspective view of one embodiment of the improved wing of the present invention.
Figure 2:
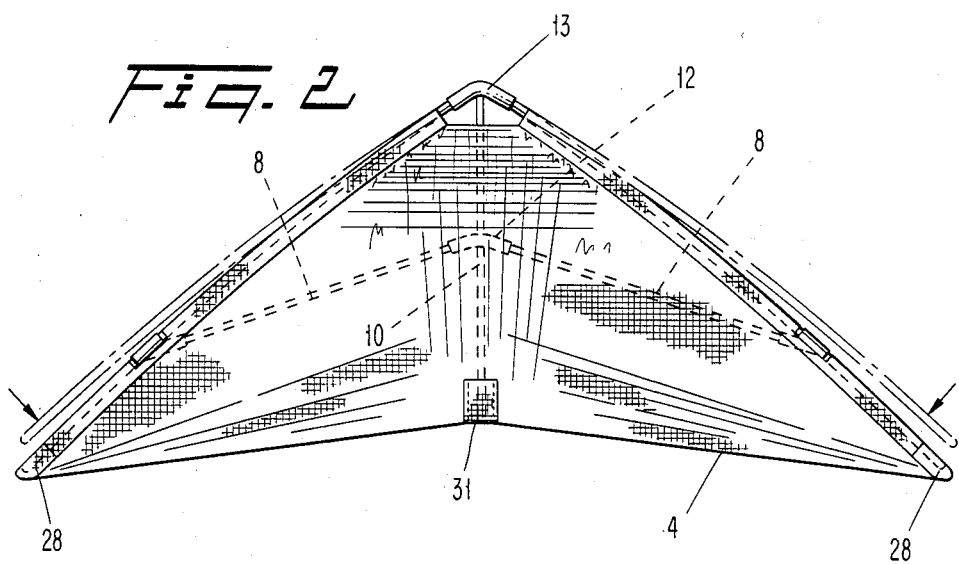
FIG. 2 is a top view of the embodiment of the improved wing of the present invention depicted in FIG. 1.

The present invention relates to stunt kites. Stunt kites are recognized in the art as steerable kites which are flown with two lines (i.e., one with each hand). A pull on the right line will cause the kite to fly to the right while a pull on the left line will cause the kite to fly to the left. Moves such as dives, loops and figure eights are the result of combinations of such actions. Such kites may be flown singly or in the form of a train (i.e., several kites connected together).

The improved wing of the present invention comprises in one of its most important aspects a dihedral sail spaced from the portion of the longitudinal brace member extending between the lateral brace members and the spar members with the lateral ends of the sail disposed rearwardly of a centrally disposed point on the leading edge of the sail. The tensioning of the sail and the configuration of the supporting frame is such that the sail assumes a dihedral shape, with the sail being caused to assume a tensioned or stressed condition along a portion of the leading edge of the sail intermediate the respective lateral ends of the sail such that the portion of the sail adjacent the longitudinal brace member is spaced from the longitudinal brace member.

The tensioned or stressed portion of the sail most preferably includes a self-induced camber or convex curve of an airfoil along a centrally disposed portion of the leading edge of the wing. Such camber is self-induced and achieved without the use of prestressed structural members positioned within the sail portion of the wing. Instead, the self-induced camber within the sail portion of the wing may be achieved totally by interaction and cooperation of both the sail and the supporting structure of the wing which supports the sail.

Another important aspect of the kite wing of the present invention is the presence of separate and opposing lateral spars which serve to stabilize the aft sections of the lateral brace members during high speed flight of the kite yet enable the lateral brace members to conform to different flight conditions. The performance characteristics of the stunt kite of the present invention are significantly enhanced by the presence of such lateral spars.

The present invention will be described in conjunction with the accompanying Figures with like elements being depicted with identical numbers.

As depicted in FIGS. 1-5, the improved stunt kite wing of the present invention comprises a swept back aerodynamic dihedral sail structure 1 having a fabric sail 4 (shown in phantom in FIG. 1 to permit viewing of the supporting structure) tensioned on a supporting frame. The supporting frame comprises elongated lateral brace members 7 along the leading edge of the wing and an elongated longitudinal brace member 10 centrally positioned intermediate the lateral ends of the lateral brace members. The longitudinal brace member is positioned along the lower surface of the sail. The lateral brace members 7 and the longitudinal brace member 10 are attached to one another at a centrally disposed terminus or point of attachment 13 located on the leading edge of the wing. The lateral brace members and the longitudinal brace member are sufficiently flexible to permit tensioning thereof although such flexibility will vary depending upon the size of the kite wing.

The supporting structure also includes opposing lateral spar members 8 attached both to the respective lateral brace members and to the longitudinal brace member. The lateral spar members 8 are fixedly attached to the lateral brace members at a point 20 intermediate the ends thereof in order to permit flexing of the rearward ends of the lateral brace members during high speed flight. While the spar members may also be fixedly attached to the longitudinal brace member at a common point, it is preferable for the spar members to be slidably engaged with the longitudinal brace member via connector 12 to permit modification of the flight characteristics of the kite by the positioning of the spar members. That is, movement of the connector 12 toward the leading end of the longitudinal brace member (direction A in FIG. 3) will draw the trailing ends of the lateral brace members toward each other. This will result in the formation of a sail which possesses a more billowed trailing edge. By contrast, movement of the connector 12 toward the trailing end of the longitudinal brace member (direction B in FIG. 3) will move the trailing ends of the lateral brace members away from each other, resulting in the formation of a sail having a more taut trailing edge. The lateral spars are preferably hingedly connected to the connector 12 to permit the spars to be positioned upon movement of the connector along the longitudinal brace member.

By way of example, connector 12 may advantageously consist of a polyethylene tube slidably placed in a transverse manner onto the longitudinal brace member with the respective ends of the lateral spars being inserted into opposite ends of the tube. The flexible nature of the tube permits the lateral spars to in effect be hingedly connected thereto.

Under either circumstance, the lateral spar members upon attachment to the longitudinal brace member and to the lateral brace members are oriented so as to define a sweep angle beta' between each other which as shown in FIG. 3 is measured in the same manner as for the sweep angle beta of the lateral brace members as discussed below. The fact that the lateral spar members are so oriented permits the lateral brace members to still flex downwardly and/or inwardly during high speed maneuvers while still being stabilized by the spar members. Positioning of the spar members in a manner in which the sweep angle beta' is not greater than 0 degress is not desirable as the flight characteristics of the kite may be adversely affected.

Advantageously, the use of separate lateral spar members permits each side of the kite wing to react independently of the other during stunt maneuvers, with applied stresses along one leading edge not being applied to the opposing leading edge as would be the case upon use of a single spar member which directly connected one lateral brace member to the other.

The fabric sail 4 is attached to the lateral brace members and to the rearward (or trailing) portion of the longitudinal brace member, with the sail being so configured and the lateral and longitudinal brace members being attached to one another in a manner such that the sail is tensioned over the supporting structure in a manner sufficient to result in the formation of a dihedral sail which in an unloaded state is spaced at least from the portion of the longitudinal brace member extending between the point of attachment 13 of the longitudinal brace member with the lateral brace members and the point of attachment 12 of the longitudinal brace member with the spar members. The sail desirably is spaced from the longitudinal brace member along its entire extent in an unloaded state (i.e., when not being flown). Preferably, the tensioned portion of the sail includes a self-induced camber portion intermediate the lateral ends of the sail adjacent a centrally disposed portion of the leading edge of the wing which serves to ensure the necessary spacing of the sail from the longitudinal brace member.

The wing includes a dihedral angle ranging from greater than 0 degrees up to about 45 degrees, as measured in a vertical plane from a line horizontally disposed to the foremost leading portion of the wing to a line coextensive with the leading edge of the wing as depicted as angle alpha in FIGS. 1 and 4. Most preferably, the dihedral angle ranges from about 5 to about 20 degrees.

The improved wing of the present invention also includes a sweep angle of from greater then 0 to about 60 degrees as measured in a horizontal plane from a line vertically disposed to the foremost leading portion of the wing to a line coextensive with the leading edge of the wing as depicted as angle beta in FIGS. 1 and 3. Preferably, the sweep angle ranges from about 25 to about 45 degrees. The maximum sweep angle employed is dependent upon the ultimate use of the wing, with kites being able to employ a sweep angle of up to 60 degrees.

The improved wing of the present invention preferably includes a self-induced camber having a height or vertical extent h as depicted in FIG. 1. The camber is preferably of greatest vertical extent adjacent the leading edge of the wing and gradually diminishes in vertical extent in the direction of the trailing edge of the wing in a manner consistent with conventional airfoil configurations. The maximum height or vertical extent of the self-induced camber is determined by the maximum dihedral angle of the wing and the tensioning of the sail.

The positioning of the maximum height or vertical extent of the camber along the extent of the intermediate longitudinal brace member may be modified by the angle of sweep of the lateral ends of wing. That is, the greater the /degree of sweep of the lateral ends of the wing the further the maximum height or vertical extent of the camber may be positioned from the leading edge of the wing.

Generally, the self-induced camber portion 34 of a sail as depicted in the Figures will extend in the lateral direction from the point of attachment of the intermediate longitudinal brace member to the lateral brace members to a point no further than approximately one-third to one-half the distance to the lateral ends of the leading edge of the wing. As discussed above, the exact lateral boundary of the self-induced camber portion will vary depending upon the configuration of the supporting structure.

The majority of the wing of the present invention as embodied in FIGS. 1–8 (with the exception of the cambered portion) is substantially planar in configuration. This is believed to be depicted in FIG. 4 where the lateral non-cambered portions of the wing are stretched across the lateral braces to form a substantially planar surface, with the cambered portion existing only within the first one-third or so of the lateral extent of the respective wing surfaces.

It has been found desirable for stunt kite wings produced in accordance with the present invention to include a billowed (or non-taut) portion along the trailing edge of the sail to enhance the stability of the kite in flight. The sail of such kites would thus preferably include an induced camber portion along a portion of the leading edge, a substantial laterally-disposed planar surface area and a billowed portion along the trailing edge.

The leading edges of the wing can extend rearwardly from the foremost point of the wing any distance which will not adversely affect the flight dynamics of the wing. In the embodiments depicted, the leading edges extend rearwardly beyond the rearmost end of the intermediate longitudinal brace member due to the delta shape of the kite. However, it should also be recognized that the rearward extent of the leading edges will depend upon the sweep angle employed and the length of the intermediate longitudinal brace member (i.e., as in a delta wing).

The wing of the present invention is comprised of a fabric sail portion 4 capable of being stretched across the supporting structural members. Such fabric is preferably comprised of a synthetic material such as a nylon, polyester or polyethylene fabric. Conventional sail or kite cloths of varied compositions are suitable. Mylar sail cloths have been found to be particularly useful. However, any suitable material may be employed, with the type of material which is employed being dependent upon the ultimate use to which the wing is to be put as well as the types of conditions to which the wing will be subjected. For example, the use of the wing as part of a kite would only necessitate the use of lightweight synthetic fabrics which are inexpensive and relatively durable. The choice of suitable fabrics for the sail is well within the level of skill of the routineer in the art.

The various members of the supporting structure of the wing are comprised of any suitable material which will enable adequate structural support to be provided for the sail while also retaining sufficient flexibility to permit such members to be placed under tension upon assembly of the wing. Such members may suitably be comprised of fiberglass, although materials such as graphite may be used if the size of the wing becomes significantly large. Such members (depending upon the size required) may be either solid in cross-section or tubular in configuration.

As depicted in FIGS. 1–6 and 8, the wing of the present invention may be delta-shaped in configuration, with the sail being of greater dimension in its lateral extent than in its longitudinal extent. However, various other shapes are possible.

The improved wing of the present invention (as depicted in FIGS. 1–6 and 8) may be assembled or formed as follows. Lateral brace members 7 are positioned within sewn-in tunnelled seams (approximately the same length as the lateral braces) provided along the lateral extent of the leading edge of the sail fabric and seated in sewn-in pockets 28 at the respective lateral end portions of the sail.

The embodiment of the sail depicted in FIGS. 1-6 and 8 is approximately delta-shaped in configuration, having a longitudinal dimension (or cord length) approximately 18 inches at center, a tip to tip dimension of approximately 54 inches, and a straight line drawn from tip to tip passing approximately 24 inches rearward of the foremost leading edge of the sail. The intermediate longitudinal brace member 10 having a length of 18 inches is seated at its trailing end in a sewn-in pocket 31 positioned at the trailing end of the sail, with the leading edge of the intermediate longitudinal brace member being attached to the remaining ends of the lateral brace members by suitable means. Such a wing has a sweep angle beta of about 45 degrees, a dihedral angle alpha of about 20 degrees and an aspect ratio (as hereafter defined) of 3:1. The wing also has a camber height of 0.5 inches at rest (or unloaded) and up to 2 inches fully loaded during flight due to flexing of the longitudinal brace member.

As depicted in the Figures, the means of attachment of the intermediate longitudinal brace member to the lateral brace members comprises a preformed or precut block 13 of a thermoplastic resin such as Delrin of such configuration so as to encourage or urge the formation of the desired dihedral and sweep back angles and the accompanying tensioning of the sail. The manner by which the longitudinal and lateral brace members are inserted into the preformed or precut block also ensures that the longitudinal brace member and lateral brace members do not reside within the same plane (as indicated by the existence of the dihedral angle).

Figure 6:
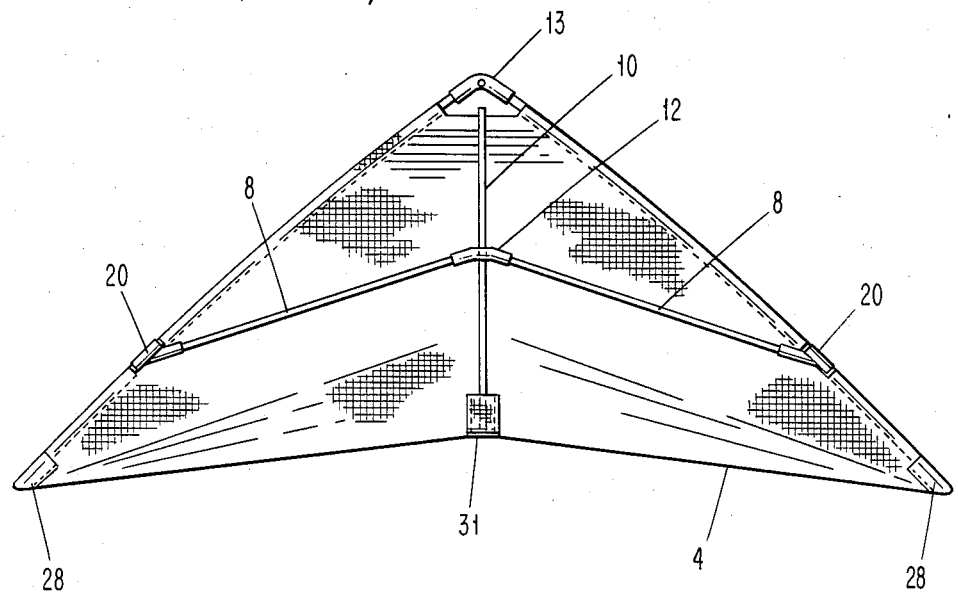
FIG. 6 is a bottom view of the embodiment of FIG. 1 in a state of partial assembly.

The degree by which the tensioned unloaded sail includes a self-induced camber portion is somewhat dependent upon the length of the intermediate longitudinal brace member 10 in relation to the longitudinal length of the sail as well as the manner by which the longitudinal brace member is attached to the lateral brace members 7. That is, once (a) the longitudinal brace member 10 is seated within the sewn-in pocket 31 in the trailing edge of wing, (b) the lateral brace members are seated within the sewn-in pockets 28 in the respective lateral edges of the sail and connected to one another via predrilled holes in the preformed block and (c) the wing placed flat on a surface, the longitudinal brace member and the preformed block must cooperate to cause the sail to be spaced from the longitudinal brace member upon formation of the kite. As depicted in FIG. 6, the premolded block is configured such that the intermediate longitudinal brace member cannot be inserted into the predrilled hole in the block without the block being rolled in a direction toward the rearward portion of the wing to position the predrilled hole adjacent the unattached leading end of the intermediate longitudinal brace member.

In an exemplary method of fabrication the sail fabric is cut and stitched in a manner which enables the sail to be stretched across the supporting structure while retaining a smooth upper surface to enhance the ability of the wing to serve as an airfoil. The sail will otherwise not lay flat in a disassembled state as shown in FIG. 6. FIG. 6 depicts the wing of FIGS. 1-5 in a partially assembled state with the Figure demonstrating that the leading centrally-disposed portion of the sail does not lay flat when the wing is such a disassembled state. However, once the longitudinal member is inserted into the preformed block that portion of the fabric will be stretched across the frame in a manner sufficient to cause the sail to be spaced from the longitudinal brace member.

Figure 7:
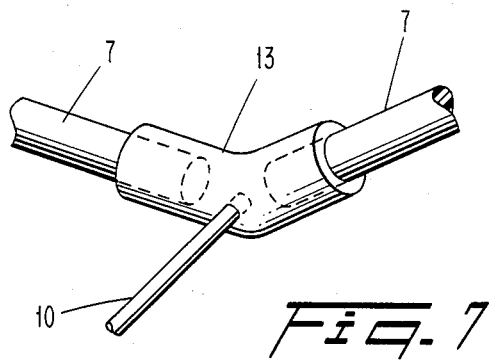
FIG. 7 is a detail view of the attachment means used to connect the lateral and longitudinal brace members in the embodiment of FIG. 1.

The longitudinal brace member 10 must be of a length sufficient to permit its attachment to the preformed block once the block and the leading edge of the wing are rolled or curled downwardly toward the leading unattached leading end of the longitudinal brace member while providing the requisite tensioning of the wing. Once such attachment occurs, a tensioned portion 34 will be formed as a result of such rolling or curling of the leading edge of the wing downwardly in relation to the lateral ends of the wing in the manner depicted by the arrow of FIG. 5. The amount of camber which exists in the noted tensioned portion can be enhanced by the shortening of the longitudinal brace member to a length which requires that the leading edge of the wing be rotated downwardly to a greater extent to permit attachment to the preformed block to the longitudinal brace member. FIG. 7 depicts the attachment of the lateral brace members and the intermediate longitudinal brace member via the preformed block 13.

Such manner of formation of the improved sail of the present invention results in the tensioning of the various members of the supporting structure of the wing. For example, the rolling or curling under of the leading edge of the wing in a manner suitable to permit attachment of the leading edge of the longitudinal supporting brace member to the premolded block results in the lateral brace member 7 being drawn rearwardly in a manner indicated by the arrows in FIG. 2 as well as upwardly in a manner indicated by the arrows in FIG. 4 resulting in the formation of the requisite dihedral angle.

The improved wing of the present invention may be employed as a stunt kite as depicted in FIG. 8. A bridle control means is advantageously employed comprised of control bar 37 connected to control lines 40, 40'. Hand grips 44, 44' are attached to the ends of the control lines. The control bar 37 is attached to the kite via lateral lines 47, 47' and longitudinal lines 51, 51'. Line 51 is preferably of a shorter length than that of line 51' to direct the wing against the lower surface of the sail. Lines 51, 51' are each desirably attached to longitudinal brace member 10 at a point spaced inwardly from the respective ends of the brace member to assist in formation of camber during flight. Further, lateral lines 47, 47' are attached to the lateral brace members at a point spaced from the lateral end of the brace member a distance approximately one-third the length of the lateral brace member.

Based on the dimensions of the stunt kite embodiment previously described, lateral lines 47, 47' are 18 inches in length, line 51 is 11 inches in length, and line 51' is 15 inches in length. Lines 51, 51' are attached to longitudinal brace 10 at points 3 inches from each end of the brace. Lines 47, 47' are attached to the lateral braces at the junction 20 of the lateral spar and the lateral brace member; i.e., at a point 12 inches from the rear of the lateral brace and 24 inches from the leading end of the lateral brace. The control bar 37 is 18 inches in length, with lines 47, 47' attached to respective ends of the control bar and lines 51, 51' attached to a common point at the center of the control bar. Such dimensions are based on only one embodiment of a stunt kite prepared in accordance with the present invention. The noted dimensions would of course vary with the size and configuration of the kite employed.

The length and positioning of the lines which comprise the bridle system affect the flight characteristics of the kite.

The length of lateral lines 47, 47' determines the degree to which the leading edges of the kite are pulled downwardly during flight resulting in a front curved profile for the kite. The kite will exhibit greater roll stability by use of lateral lines of a length which reduce the curvature of the profile. On the other hand, the kite will exhibit less roll stability (i.e., less resistance to rolling) by use of lateral lines of a length which increase the curvature of the profile. Stunt kites desirably are roll unstable to enhance the ability of the kite to perform desired rolls and loops.

As described above and depicted in FIG. 8, the stunt kite of the present invention is in essence a dynamic structure. That is, the kite has the ability to modify its structural configuration during flight based on the wind speed and the speed and attitude of the kite. Once airborne, the kite assumes a loaded state which results in the flexing of the longitudinal and lateral brace members. Such flexing of the longitudinal brace member will increase the amount of camber existing in the portion 34 of the sail adjacent the leading edge irrespective of whether a significant amount of camber existed initially. However, portion 34 of the sail will nonetheless remain in a tensioned state due to the flexing of the various supporting members under load.

One particular advantage of the kite of the present invention is its ability to expose a sail to the wind the surface of which is under tension as opposed to being loosely inflated by the wind.

Such flexing of the lateral brace members during flight (encouraged by lines 47, 47') will also advantageously result in a curved front profile for the kite along the leading edges of the wing. The noted curved profile is believed to significantly enhance the aerodynamic characteristics of the wing.

If desired, the kite may be flown as part of a train of kites. In such an instance, control lines of the other kites may be attached to the support structure of an adjacent kite in a known manner.

The relative aspect ratio of the wing of the present invention affects the performance characteistics of the wing. The aspect ratio is defined as the ratio of span to cord, with the span being the distance from wing tip to wing tip and the cord being the longitudinal length of the wing at center. Kite wings have been found to function satisfactorily with aspect ratios of from about 1:1 to 7:1.

The detailed description set forth is the preferred embodiment of the method of the present invention. However, certain changes may be made in carrying out the above method without departing from the scope of the invention. It is therefore intended that all matter contained in the above description shall be interpreted as illustrative and not in a limited sense. It is also to be understood that the following claims are intended to discover all the generic and specific features of the invention herein described, and all statements of the scope of the invention, which as a matter of language, might be said to fall therebetween.

What is claimed is:

1. An improved stunt kite wing comprising an aerodynamic dihedral sail structure having a fabric sail tensioned on a supporting frame, said supporting frame comprised of opposing elongated lateral brace members along the leading edge of the wing and an elongated longitudinal brace member positioned beneath the lower surface of said wing intermediate the ends of the lateral brace members, first ends of said lateral brace members and a first end of said longitudinal brace member being attached to one another at a common terminus centrally positioned along the leading edge of the wing to define a fixed dihedral and sweep angle, the leading edge of said fabric sail being attached to both said lateral brace members and the trailing edge of said fabric sail being attached to a rearwardly disposed second end of said longitudinal brace member, said sail extending between laterally disposed second ends of said lateral brace members and said rearwardly disposed second end of said longitudinal brace member, opposing lateral spar members each attached to said lateral brace members at points intermediate said first and second ends of each said lateral brace members as well as to said longitudinal brace member at a common point, said common point of attachment to said longitudinal brace member being forwardly disposed of the points of attachment of said spar members to said lateral brace members, said lateral and longitudinal brace members being so attached to one another and said sail being so configured and caused to be tensioned over said brace members whereby a dihedral sail is formed, the lateral ends of which are positioned rearwardly from said common terminus and which sail assumes a tensioned or stressed condition along a portion of the leading edge of the wing intermediate the laterally disposed second ends of the lateral brace members such that the sail is spaced from the portion of the longitudinal brace member extending between said common terminus and said spar members.

2. The wing of claim 1 wherein said dihedral angle of the wing ranges from greater than 0 up to about 45 degrees.

3. The wing of claim 2 wherein the dihedral angle ranges from about 5 to 20 degrees.

4. The wing of claim 1 wherein said lateral brace members, said lateral spar members and said longitudinal brace member are comprised of fiberglass.

5. The wing of claim 1 wherein the maximum lateral dimension of the sail exceeds the maximum longitudinal dimension of the sail.

6. The wing of claim 1 wherein said fabric is comprised of a synthetic material.

7. The wing of claim 6 wherein said synthetic material is selected from the group consisting of nylon, polyester and polyethylene.

8. The wing of claim 1 wherein said sail includes a self-induced camber portion along only a portion of the leading edge of the wing intermediate the laterally disposed ends of the lateral brace members and centrally positioned along the leading edge of the wing.

9. The wing of claim 1 having a sweep angle of up to about 60 degrees.

10. The wing of claim 9 wherein said sweep angle ranges from about 25 to 45 degrees.

11. The wing of claim 8 wherein said first ends of said lateral brace members and said first end of said longitudinal brace members are attached to one another by means of a preformed fitting into which each of said first ends is inserted, said fitting being configured to result in the formation of said dihedral angle upon insertion of said lateral brace members and said fitting and said longitudinal brace member cooperating to result in the formation of said self-induced camber portion upon insertion of said longitudinal brace member into said fitting.

12. The wing of claim 8 wherein portions of said sail which are laterally adjacent to said self-induced camber portion are substantially planar in configuration.

13. The wing of claim 1 wherein said opposing spar members are slidably attached to said longitudinal brace member by means of a common fitting.

14. The wing of claim 13 wherein said fitting comprises a transversely positioned sleeve slidably engaged with said longitudinal brace member.

15. The wing of claim 1 wherein said lateral spar members are fixedly attached to said lateral brace members.

* * * * *